(12) United States Patent
Matsumoto

(10) Patent No.: US 7,391,692 B2
(45) Date of Patent: Jun. 24, 2008

(54) DISK APPARATUS AND DISK TYPE DETERMINATION METHOD THEREOF

(75) Inventor: Masaki Matsumoto, Daito (JP)

(73) Assignee: Funai Electric Co., Ltd., Osaka (JP)

( * ) Notice: Subject to any disclaimer, the term of this patent is extended or adjusted under 35 U.S.C. 154(b) by 561 days.

(21) Appl. No.: 11/090,030

(22) Filed: Mar. 28, 2005

(65) Prior Publication Data

US 2005/0219978 A1    Oct. 6, 2005

(30) Foreign Application Priority Data

Apr. 5, 2004    (JP)    ............... 2004-110939

(51) Int. Cl.
    *G11B 7/00*    (2006.01)
(52) U.S. Cl. ................. 369/53.22; 369/44.27
(58) Field of Classification Search ....... None
    See application file for complete search history.

(56) References Cited

U.S. PATENT DOCUMENTS

| 5,289,451 A | * | 2/1994 | Ashinuma et al. | ........ 369/47.55 |
| 5,684,773 A | * | 11/1997 | Hayashi | ............ 369/47.35 |
| 6,005,832 A | * | 12/1999 | Kumagai | ............ 369/44.27 |
| 6,125,087 A | * | 9/2000 | Ohnishi et al. | .......... 369/44.23 |

FOREIGN PATENT DOCUMENTS

| JP | 05-151600 | 6/1993 |
| JP | 10-069640 A | 3/1998 |
| JP | 2002-329337 A | 11/2002 |
| JP | 2003-016641 | 1/2003 |
| JP | 2003-030878 | 1/2003 |
| JP | 2003016641 A * | 1/2003 |
| JP | 07-326062 A | 12/2005 |

\* cited by examiner

*Primary Examiner*—Joseph Feild
*Assistant Examiner*—Peter Vincent Agustin
(74) *Attorney, Agent, or Firm*—Global IP Counselors, LLP

(57) ABSTRACT

A disk apparatus includes a light emitter that emits a light beam to be reflected on the optical disk, a light detector that detects a reflected light beam that is reflected from the optical disk, the light detector also outputting detection signals based on the amount of the reflected light beam detected, and a controller determines whether the optical disk is a recordable optical disk or not based on the detection signals. The controller also shifts a spot on the light detector at which the reflected light beam is incident by adjusting the focus point of the light beam on the optical disk in the radial direction when the controller determines that the optical disk is not a recordable optical disk. A wobble signal can be detected with high precision at low cost even when the position of the light detector is not balanced in the radial direction.

7 Claims, 4 Drawing Sheets

DISK APPARATUS AND DISK TYPE DETERMINATION METHOD THEREOF

BACKGROUND OF THE INVENTION

1. Field of the Invention

The present invention relates to a disk apparatus for recording and reading information data on an optical disk, and a disk determination method employed therein. More particularly, the present invention relates to a disk apparatus that can detect a wobble signal with high precision and determine the type of optical disk.

2. Background Information

There are known various types of optical disks, which include the following types among other types: read-only CD-ROMs (Compact Disk-Read Only Memory), read-only DVD-ROMs (Digital Versatile Disk-Read Only Memory), one-time recordable CD-Rs (Compact Disk-Recordable), one-time recordable DVD-Rs (Digital Versatile Disk-Recordable), rewriteable CD-RWs (Compact Disk-ReWriteable), rewriteable DVD-RWs (Digital Versatile Disk ReWriteable). In this specification hereinafter, one-time recordable CD-Rs, one-time recordable DVD-Rs, rewriteable CD-RWs and rewriteable DVD-RWs are collectively referred to as "recordable optical disks," while read-only CD-ROMs and read-only DVD-ROMs are collectively referred to as "read-only optical disks."

Recordable optical disks differ from read-only optical disks in that groove tracks and land tracks are formed in advance on the recording surface of the recordable optical disk. A wobbled groove that wobbles at a predetermined frequency is formed on the edge of the groove tracks, such that the rotational speed of the optical disk can be controlled based on a wobble signal that is detected from the wobbling of the wobbled groove. Also, land pre-pits are formed in the land track, so that the addresses can be read from a recordable optical disk in which data has not been recorded or a rewriteable optical disk. Generally, data is read from an optical disk by reflecting a light beam on the surface of the optical disk, and detecting the reflected light beam with a light detector.

When an optical disk is loaded onto a disk apparatus, it must be determined whether the loaded optical disk is a read-only optical disk, a recordable optical disk, or a rewriteable optical disk. One known method for determining the type of optical disk is a method that determines the type of optical disk based on whether or not a wobble signal that changes periodically due to the wobbling is detected by the optical pickup when the optical disk is rotated.

However, when the light detector of an optical pickup is placed in an unbalanced manner in the radial direction of the optical disk, the signal level of the wobble signal falls below the noise level even if there is a wobble in the groove of the optical disk. As a result, the wobble signal cannot be detected accurately. It is generally extremely difficult to place every light detector in a balanced manner in the radial direction of the optical disk. Furthermore, the balance of the light detector may change overtime, particularly due to changes in the temperature. Therefore, even if a light detector is placed in a balanced manner initially, the balance may be lost overtime.

Japanese Patent Application Publication No. 2002-329337 discloses a structure in which a light beam is split into a primary beam and two secondary beams, the position of an objective lens of an optical pickup is adjusted in the radial direction of an optical disk so that a wobble signal and a land pre-pit signal detected by the optical pickup have their maximum amplitudes, while adjusting the objective lens such that the offset of the differential signal created from the light signals from reflected lights of a primary beam and secondary beams on an optical recording medium is zero.

In this arrangement, however, since each of the reflected lights of the primary beam and the two secondary beams reflected from the recording surface of the optical disk must be received, the wobble signals cannot be detected with high precision at a low cost.

In Japanese Patent Application Publication No. 7-326062, a light beam is split into a primary beam and two secondary beams, and the primary beam and the secondary beams of a light beam are focused on the recording surface of a disk-shaped recording medium. The primary beam and the secondary beams of the light beam that are reflected on the disk-shaped recording medium are received. The accurate wobble signals are detected by canceling the offset of the differential signal created from the received primary beam with the secondary beams.

In this arrangement also, since each of the reflected lights of the primary beam and the two secondary beams reflected from the recording surface of the optical disk must be received, the wobble signals cannot be detected with high precision at a low cost.

In Japanese Patent Application Publication No. 10-69640, a light beam is split into a primary beam and two secondary beams, and the wobbled signal is obtained accurately by performing a subtraction with the light signals of the primary beam received by each of the inner half and the outer half of the light receiving photodiode after performing a normalization operation to each of the light signals of the primary beam.

In this arrangement also, each of the reflected lights of the primary beam and the two secondary beams reflected from the recording surface of the optical disk must be received and the normalization operation must be performed on the received lights. Therefore, the wobble signals cannot be detected with high precision at a low cost.

In view of the above, it will be apparent to those skilled in the art from this disclosure that there exists a need for improved disk apparatus and disk type determination method that overcome the problems of the conventional art. This invention addresses this need in the art as well as other needs, which will become apparent to those skilled in the art from this disclosure.

SUMMARY OF THE INVENTION

An object of the present invention is to provide a disk apparatus that can detect a wobble signal with high precision at low cost and prevent errors in determining the type of optical disk even when the balance of the quartered light detector of an optical pickup is displaced in the radial direction of the optical disk.

A disk apparatus is adapted to record and read data on and from a recordable optical disk, and to read data from a read-only optical disk, and includes a spindle motor, a light emitter, a lens, a light detector, and a controller. The spindle motor is adapted to rotate an optical disk. The light emitter is configured to emit a light beam to be reflected on the optical disk. The light beam is focused on the optical disk through the lens. The light detector is configured to detect a reflected light beam that is reflected from the optical disk. The light detector is further configured to output a detection signal based on the amount of the reflected light beam detected. The controller is operatively coupled to the light detector and the lens and configured to determine whether the optical disk is a recordable optical disk based on the detection signal outputted from the light detector. The controller is further configured to adjust the lens to shift a spot on the light detector at which the reflected light beam is incident by shifting a focus point of the light beam on the optical disk in a radial direction of the optical disk at least the first time the controller determines that the optical disk is not a recordable optical disk.

A disk type determination method is to be applied in a disk apparatus that records and reads data on and from a recordable optical disk and reads data from a read-only optical disk. The disk type determination method includes steps of rotating an optical disk; emitting a light beam that is focused and reflected on the optical disk; detecting a reflected light beam reflected from the optical disk and outputting a detection signal based on the amount of the reflected light beam detected; determining whether the optical disk is a recordable disk or not based on the detection signal; and shifting a focus point of the light beam on the optical disk at least after the first time it is determined that the optical disk is not a recordable optical disk.

These and other objects, features, aspects and advantages of the present invention will become apparent to those skilled in the art from the following detailed description, which, taken in conjunction with the annexed drawings, discloses a preferred embodiment of the present invention.

BRIEF DESCRIPTION OF THE DRAWINGS

Referring now to the attached drawings which form a part of this original disclosure.

DETAILED DESCRIPTION OF THE PREFERRED EMBODIMENTS

Selected embodiments of the present invention will now be explained with reference to the drawings. It will be apparent to those skilled in the art from this disclosure that the following descriptions of the embodiments of the present invention are provided for illustration only and not for the purpose of limiting the invention as defined by the appended claims and their equivalents.

Figure 1:
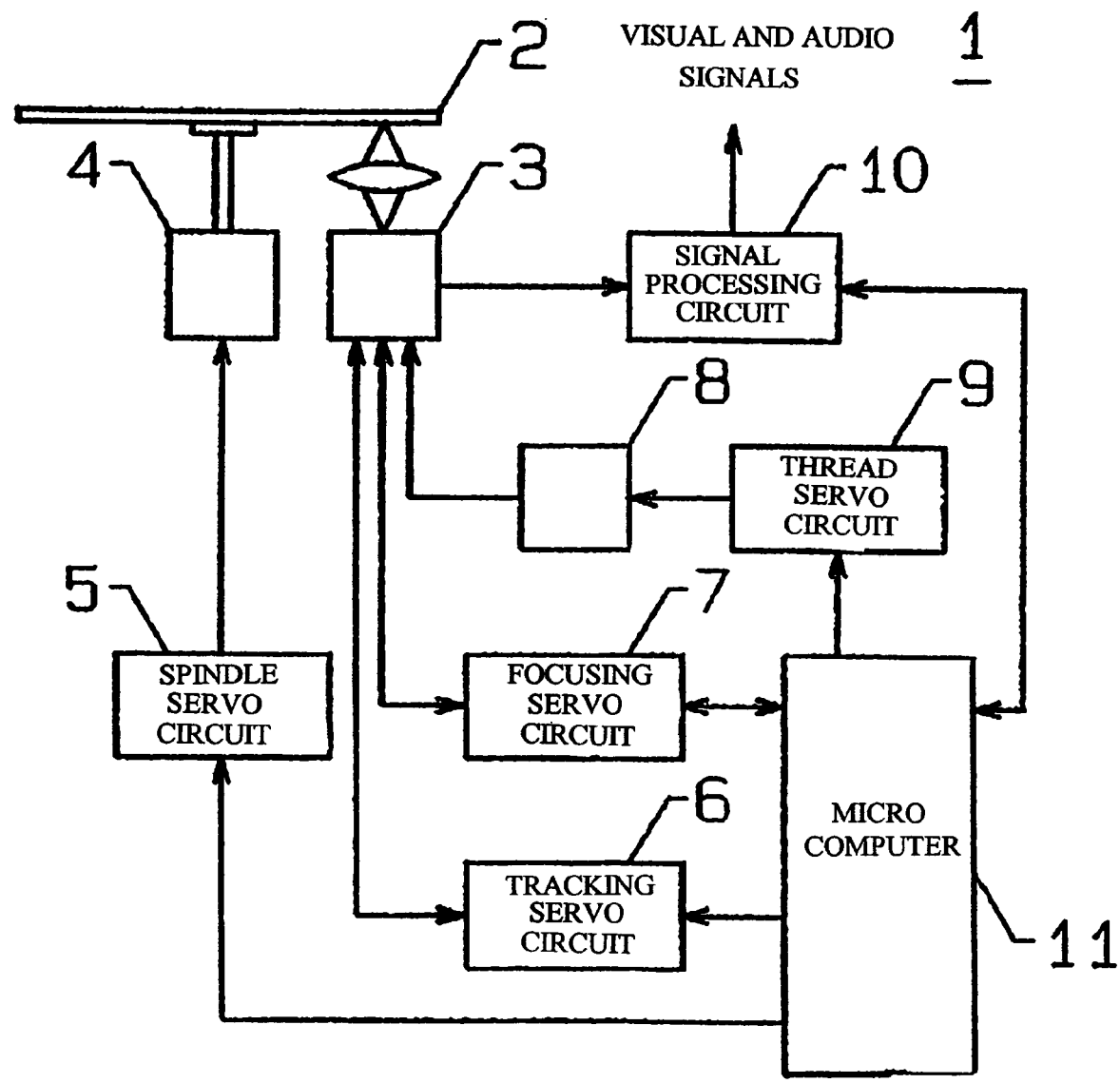
FIG. 1 is a block diagram showing the configuration of a disk apparatus according to an embodiment of the present invention.
Figure 2:
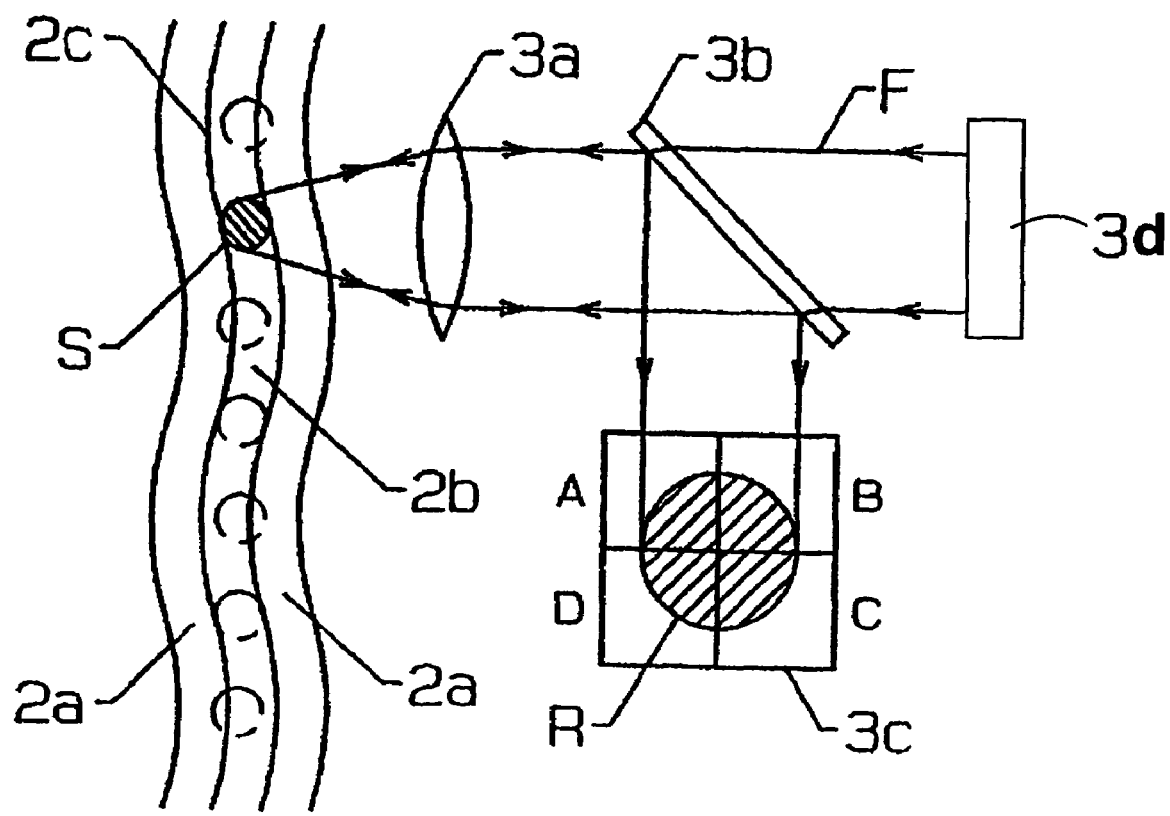
FIG. 2 is an explanatory diagram showing the operation of detecting a wobble signal in a disk apparatus according to the embodiment of the present invention.
Figure 3:
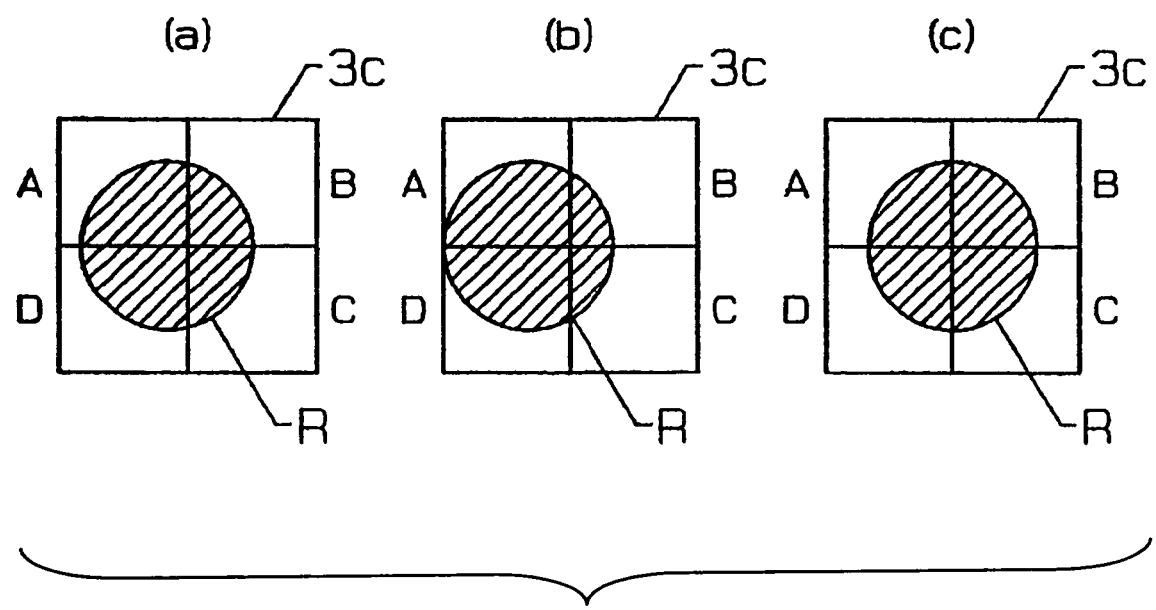
FIGS. 3(a)-(c) are explanatory diagrams showing a spot on which the light beam is incident on a quarterly divided light detector of a disk apparatus according to the embodiment of the present invention.
Figure 4:
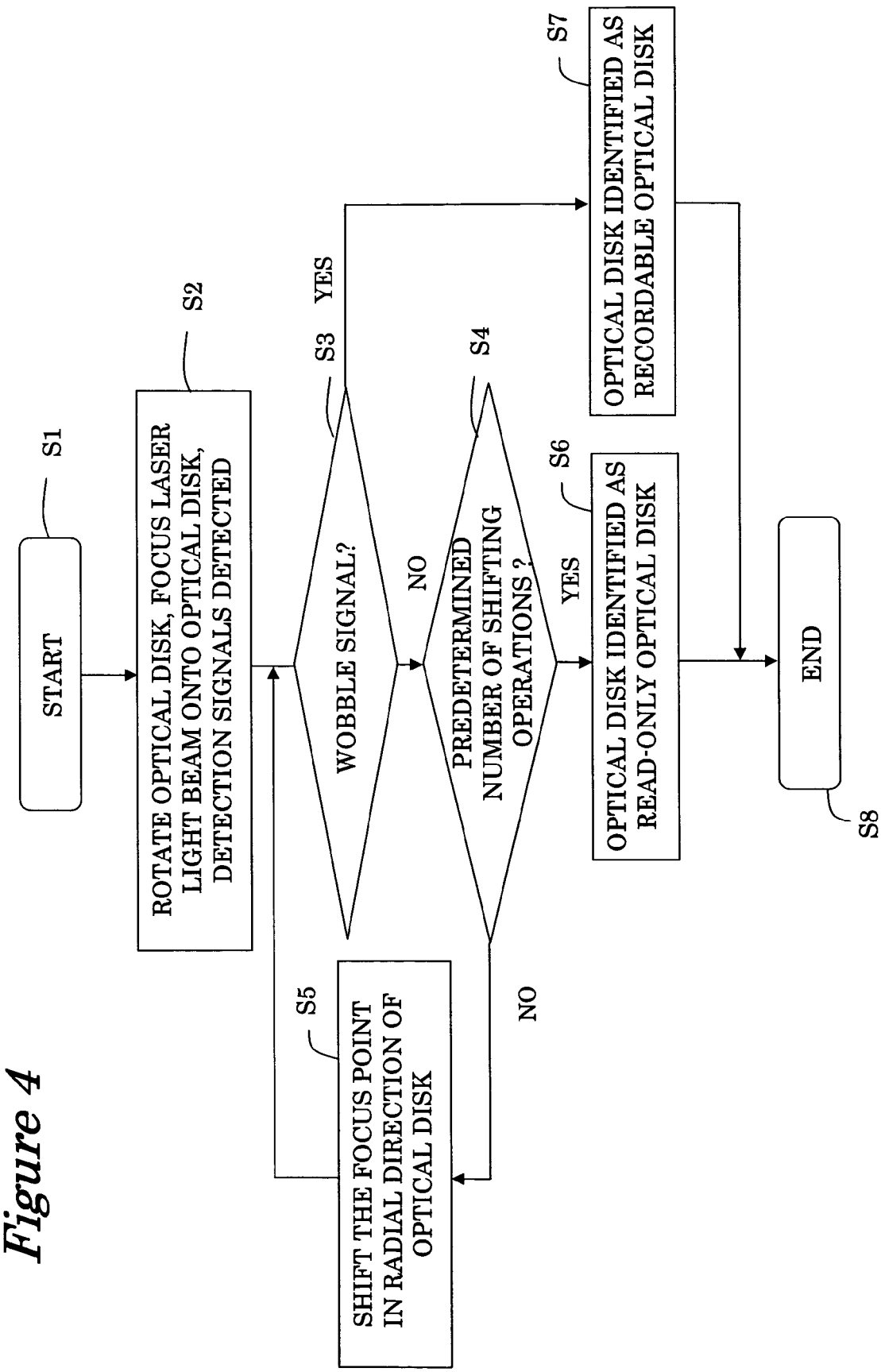
FIG. 4 is a flowchart showing the operation of the disk apparatus according to the embodiment of the present invention.

The preferred embodiments for implementing the present invention will now be described in detail with reference to the corresponding diagrams. FIG. 1 is a block diagram showing the configuration of a disk apparatus according to an embodiment of the present invention. FIG. 2 is an explanatory diagram showing the operation of detecting a wobble signal in a disk apparatus according to an embodiment of the present invention. FIG. 3 is an explanatory diagram showing a light beam incident on a quartered light detector in a disk apparatus according to an embodiment of the present invention. FIG. 4 is a flowchart showing the operation of the disk apparatus according to an embodiment of the present invention.

First, the block diagram of a disk apparatus according to an embodiment of the present invention will be described with reference to FIG. 1. The disk apparatus 1 includes an optical pickup 3, a spindle motor 4, a spindle servo circuit 5, a tracking servo circuit 6, a focusing servo circuit 7, a sled motor 8, a sled servo circuit 9, a signal processing circuit 10, and a microcomputer 11.

The optical pickup 3 directs laser light from a light emitting element 3d such as a laser diode onto an optical disk 2 to record data onto the optical disk 2. The optical pickup 3 also detects the light reflected from the optical disk 2, and reads out the data recorded on the optical disk 2. The optical pickup 3 also detects a wobble signal from the wobble groove formed in the groove track of the optical disk 2 in advance.

The spindle motor 4 rotates the optical disk 2. The spindle servo circuit 5 performs servo control on the rotational speed of the spindle motor 4. In this embodiment, the spindle servo circuit 5 controls the spindle motor 4 in the CLV (Constant Linear Velocity) mode. However, the spindle servo circuit 5 may control the spindle motor 4 in other suitable mode as well.

The tracking servo circuit 6 performs servo control on the tracking of the optical pickup 3. In other words, the tracking servo circuit 6 controls the objective lens 3a such that the focus point of the laser beam light F is on a proper point of the optical disk 2 in the radial direction. More specifically, the tracking control is performed using a tracking error signal that is obtained from the light signals detected by the optical pickup 3. In this embodiment, the tracking servo circuit 6 performs the tracking control in the DPD (Differential Phase Detection) method. However, the tracking servo circuit 6 may perform the tracking control in other suitable method as well.

The focusing servo circuit 7 performs servo control on the focus of the optical pickup 3. In other words, the focusing servo circuit 7 controls the position of the optical pickup 3 in a direction perpendicular to the optical disk 2, such that the focus of the light beam is on the surface of the optical disk 2. More specifically, the focus control is performed using a focus error signal that is obtained from the light signals detected by the optical pickup 3. In this embodiment, the focusing servo circuit 7 performs the focusing control in the astigmatism method. However, the focusing servo circuit 7 may perform the focusing control in other suitable method as well.

The sled motor 8 moves the optical pickup 3 in the radial direction of the optical disk 2. The sled servo circuit 9 performs servo control on the rotational direction and rotational speed of the sled motor 8.

The signal processing circuit 10 detects data read by the optical pickup 3 in synchronization with the standard clock, converts the analog signal data of into digital signals. The signal processing circuit 10 also demodulates the data converted into digital signals, corrects errors in the demodulated data, decompresses the data that has been compressed with a specific compression format, and thereby decodes the original data. The signal processing circuit 10 then encodes the decoded data into data of a composite signal according to a specific signal format, for example, the NTSC (National Television System Committee) format. The signal processing circuit 10 further converts the data encoded according to the signal format into data of an analog signal, and reads the resulting data.

The microcomputer 11 is configured to control the entire system of the disk apparatus 1. The microcomputer 11 stores various programs to perform the control of various circuits as described below.

The operation of the disk apparatus configured as described above will now be described.

When the optical disk 2 is loaded into the disk apparatus 1, the microcomputer 11 sends a control signal to the spindle servo circuit 5, the tracking servo circuit 6, the focusing servo circuit 7, and the sled servo circuit 9. Accordingly, the spindle servo circuit 5 is activated, and the optical disk 2 is rotated by the spindle motor 4. A laser light beam F is emitted from the light emitting element. Due to the focusing control of the focusing servo circuit 7, the laser light beam F is focused on a light spot S on the recording surface of the optical disk 2 through a lens 3a of the optical pickup 3. Once the laser light beam F is reflected on the optical disk 2, the reflected light is reverted back to parallel light through the lens 3a. The reflected parallel light beam is further reflected by a half mirror 3b, such that the reflected light beam forms a circular spot R on light receiving elements A, B, C, and D of a quarterly-divided light detector 3c as shown in FIG. 2. The direction of the vertical dividing line of the quarterly-divided light detector 3c as seen in FIG. 2 corresponds to the radial direction of the optical disk 2. The light receiving elements B and C of this embodiment correspond to the first portion of the light detector 3c, while the light receiving elements A and D correspond to the second portion of the light detector 3c.

As shown in FIG. 2, when the quarterly-divided light detector 3c of the optical pickup 3 detects the light, each of the light receiving elements A, B, C, D of the quartered light detector 3c produces a detection signal, which corresponds to the amount of light detected therein. The microcomputer 11 then calculates a sum of the detection signals outputted from the light receiving elements A and D and a sum of the detection signals outputted from the light receiving elements B and C, and determines whether the difference between the sum of the detection signals from the light receiving elements A and D and the sum of the detection signals from the light receiving elements B and C is a signal varies periodically at a frequency within the frequency range of a wobble signal. If the optical disk 2 is a recordable optical disk, it should have a wobbled groove 2c as shown in FIG. 2. When light beam is reflected on the wobble groove 2c, the reflected light becomes a wobble signal that varies at predetermined high frequencies. Such wobble signal is created due to windings of the wobble groove 2c. Thus, if the differential signal described as the following equation (1) has the frequency of a wobble signal, then the microcomputer 11 determines that the optical disk 2 loaded into the disk apparatus 1 is a recordable optical disk.

$$DS=(A+D)-(B+C) \quad (1)$$

Where A, B, C, and D each indicate the detection signal of the light receiving elements A, B, C, and D.

The above-mentioned equation (1) can properly determine whether the optical disk 2 is a recordable disk. However, when the quarterly divided light detector 3c of the optical pickup 3 is out of balance in the radial direction of the optical disk 2, the circular spot R of the reflected light becomes misaligned relative to the lines dividing the quarterly divided light detector 3c as shown in FIG. 3(a). As a result, the sum of the detection signals outputted from the light receiving elements B and C of the quarterly divided light detector 3c decreases, and the difference between the sum of the detection signals from the light receiving elements B and C and the sum of the detection signals from the light receiving elements A and D falls below the noise level. Therefore, it is difficult to determine whether a wobble signal is detected.

In this invention, when a differential signal that is within the frequency of the wobble signal is not detected from the detection signals of the reflected light beam that is reflected from the optical disk 2, the microcomputer 11 sends a control signal to the tracking servo circuit 6, such that the focal point of the light spot S of the laser light beam F is shifted inward by a first predetermined amount in the radial direction of the optical disk 2. Accordingly, the position at which the reflected light beam reflected from the optical disk 2 is incident on the quartered light detector 3c is shift radially inward (see FIG. 3(b)). It is then determined whether a signal within the frequency range of the wobble signal has been detected by the quartered light detector 3c of the optical pickup 3, and when a signal within the frequency range of the wobble signal has been detected, the optical disk 2 loaded into the disk apparatus 1 is identified as a recordable optical disk.

When a differential signal within the frequency range of the wobble signal is not detected even after the focal point of the light spot S of the laser light beam F is shifted inward in the radial direction of the recording surface of the optical disk 2, the microcomputer 11 sends another control signal to the tracking servo circuit 6, such that the position of the light spot S of the laser light beam F is shifted outward by a second predetermined amount in the radial direction of the recording surface of the optical disk 2. In the example of FIG. 3, the spot R of the reflected light beam is shifted to the position shown in FIG. 3(c) after the second control signal to the tracking servo circuit. The detection signals of the reflected light beam are then outputted from the quarterly divided light detector 3c of the optical pickup 3, and it is determined whether a differential signal within the frequency range of the wobble signal is detected. If such differential signal is detected, the optical disk 2 loaded in the disk apparatus 1 is determined to be a recordable optical disk or a rewriteable optical disk. On the other hand, if no differential signal within the frequency range of the wobble signal is detected, the optical disk 2 loaded in the disk apparatus 1 is identified as a read-only optical disk.

Thus, even when the balance of the quarterly-divided light detector 3c of the optical pickup 3 is misaligned in the radial direction of the optical disk 2, it is possible to prevent errors in determining the type of optical disk 2 loaded in the disk apparatus 1 because the position on the quarterly divided light detector 3c on which the reflected light beam reflected from the recording surface of the optical disk is incident can be shifted in the radial direction of the optical disk 2. Therefore, it is possible to determine whether a differential signal within the frequency range of the wobble signal is detected or not with a high precision using the quarterly divided light detector 3c of the optical pickup 3.

The operation of the disk apparatus in accordance with the present embodiment will now be explained with reference to the flowchart shown in FIG. 4.

When the optical disk 2 is loaded into the disk apparatus 1 in step S1, the process advances from step S1 to step S2.

In step S2, the optical disk 2 starts being rotated. The spindle servo circuit 5, the tracking servo circuit 6, and the focus servo circuit 7 are activated. As discussed above, the spindle servo circuit 5 controls the spindle motor 4 in the CLV mode. The tracking servo circuit 6 performs the tracking control in the DPD method. The focusing servo circuit 7 controls the focusing control in the astigmatism method. Then, a laser light beam F is focused on the recording surface of the optical disk 2. The differential signal of the reflected light beam is obtained from the equation (1) based on detection signals detected by the quarterly divided light detector 3c of the optical pickup 3. The process then advances to step S3.

In step S3, it is determined whether a wobble signal is detected. More specifically, it is determined whether the differential signal of the detection signals of the reflected light beam that is reflected from the recording surface of the optical disk 2 is within the frequency range of a wobble signal. If the differential signal of the detection signals from the reflected light beam that is reflected from the recording surface of the optical disk 2 is within the frequency range of the wobble signal, the process advances to step S7. On the other hand, if the differential signal of the detection signals from the reflected light beam is not within the frequency range of the wobble signal, the process advances to step S4.

In step S4, it is determined whether the focal point of the laser light beam F should be shifted in the radial direction. More specifically, it is determined whether the shifting of the focal point of the laser light beam F has been repeated a predetermined number of times. If the shifting of the focal point of the laser light beam has been repeated the predetermined number of times, the process advances to step S6. Otherwise, the process advances to step S5.

In step S5, the focal point of the light spot of the laser light beam F is shifted by a predetermined amount in the radial direction of the optical disk 2. Then, the process returns to step S3, where it is determined again whether a wobble signal is detected.

In step S6, the microprocessor 11 determines that the optical disk 2 loaded in the disk apparatus 1 is a read-only optical disk. The process then advances to step S8, where the operation is completed until another disk is inserted.

In step S7, the microprocessor 11 determines that the optical disk 2 loaded in the disk apparatus 1 is either a recordable optical disk. The process then advances to step S8, where the operation is completed until another disk is inserted.

According to the disk apparatus in accordance with the first aspect of the present invention is adapted to record and read data on and from a recordable optical disk, and to read data from a read-only optical disk, and includes a spindle motor, a light emitter, a lens, a light detector, and a controller. The spindle motor is adapted to rotate an optical disk. The light emitter is configured to emit a light beam to be reflected on the optical disk. The light beam is focused on the optical disk through the lens. The light detector is configured to detect a reflected light beam that is reflected from the optical disk. The light detector is further configured to output a detection signal based on the amount of the reflected light beam detected. The controller is operatively coupled to the light detector and the lens and configured to determine whether the optical disk is a recordable optical disk based on the detection signal outputted from the light detector. The controller is further configured to adjust the lens to shift a spot on the light detector at which the reflected light beam is incident by shifting a focus point of the light beam on the optical disk in a radial direction of the optical disk at least the first time the controller determines that the optical disk is not a recordable optical disk.

The disk apparatus in accordance with the second aspect of the present invention is the disk apparatus in accordance with the first aspect of the present invention, in which the controller is configured to determine that the optical disk is a read-only optical disk when the controller determines that the optical disk is not a recordable optical disk after the spot on the light detector is shifted a predetermined number of times.

The disk apparatus in accordance with the third aspect of the present invention is the disk apparatus in accordance with the first or second aspect of the present invention, in which the controller is configured to determine whether the optical disk is a recordable disk based on whether the detection signal outputted by the light detector has a frequency within a frequency range of a wobble signal.

The disk apparatus in accordance with the fourth aspect of the present invention is the disk apparatus in accordance with one of the first through third aspects of the present invention, in which the light detector has first and second portions, which respectively output first and second detection signals, and the controller is configured to determine that the optical disk is a recordable disk if a differential signal indicating a difference between first and second detection signals of the first and second portions has a frequency within a frequency range of a wobble signal.

A disk apparatus in accordance with the fifth aspect of the present invention is adapted to record and read data on and from a recordable optical disk, and to read data from a read-only optical disk, and includes rotating means, light emitting means, focusing means, light detection means, disk determination means, and light beam shifting means. The rotating means rotates an optical disk. The light emitting means emits a light beam to be reflected on the optical disk. The focusing means focuses the light beam on the optical disk. The light detection means detects a reflected light beam that is reflected from the optical disk. The light detection means also outputs a detection signal that corresponds to the amount of the reflected light beam detected. The disk determination means determines whether the optical disk is a recordable optical disk based on whether the detection signal outputted from the light detection means has a frequency within a frequency range of a wobble signal. The light beam shifting means adjusts the focusing means to shift a focus point of the light beam on the optical disk in a radial direction of the optical disk at least the first time the disk determination means determines that the optical disk is not a recordable optical disk.

The disk apparatus in accordance with the sixth aspect of the present invention is the disk apparatus in accordance with the fifth aspect of the present invention, in which the disk determination means determines that the optical disk is a read-only optical disk when the disk determination means determines that the optical disk is not a recordable optical disk after the spot at which the light detecting means receives the reflected light beam is shifted a predetermined number of times.

A disk type determination method in accordance with the seventh aspect of the present invention is to be applied in a disk apparatus that records and reads data on and from a recordable optical disk and reads data from a read-only optical disk. The disk type determination method includes steps of: rotating an optical disk; emitting a light beam that is focused and reflected on the optical disk; detecting a reflected light beam reflected from the optical disk and outputting a detection signal based on the amount of the reflected light beam detected; determining whether the optical disk is a recordable disk or not based on the detection signal; and shifting a focus point of the light beam on the optical disk at least after the first time it is determined that the optical disk is not a recordable optical disk.

The disk type determination method in accordance with the eighth aspect of the present invention is the disk type determination method in accordance with the seventh aspect of the present invention, further including steps of: repeating the step of detecting a reflected light beam and the outputting of a detection signal after the shifting of a focus point of the light beam on the optical disk; and repeating the step of determining whether the optical disk is a recordable optical disk or not based on the detection signal. It is determined that the optical disk is a read-only optical disk if it is determined that the optical disk is not a recordable optical disk after the focus point of the light beam on the optical disk is shifted predetermined number of times.

The disk type determination method in accordance with the ninth aspect of the present invention is the disk type determination method in accordance with the seventh or eighth aspect of the present invention, wherein in the step of determining whether the optical disk is a recordable optical disk or not, the determination is based on whether the detection signal has a frequency within a frequency range of a wobble signal.

The disk type determination method in accordance with the tenth aspect of the present invention is the disk type determination method in accordance with any of the seventh through ninth aspects of the present invention, wherein in the step of detecting the reflected light beam, first and second detection signals are outputted, and in the step of determining whether the optical disk is a recordable optical disk or not, it is determined that the optical disk is a recordable disk if a differential signal indicating a difference between first and second detection signals has a frequency within a frequency range of a wobble signal.

With the present invention, a wobble signal can be detected with high precision at low cost, and errors in determining the type of optical disk can be reduced even when the balance of the light detector of an optical pickup is displaced in the radial direction of the optical disk.

As used herein, the following directional terms "forward, rearward, above, downward, vertical, horizontal, below and transverse" as well as any other similar directional terms refer to those directions of a device equipped with the present invention. Accordingly, these terms, as utilized to describe the present invention should be interpreted relative to a device equipped with the present invention.

The term "configured" as used herein to describe a component, section or part of a device includes hardware and/or software that is constructed and/or programmed to carry out the desired function.

Moreover, terms that are expressed as "means-plus function" in the claims should include any structure that can be utilized to carry out the function of that part of the present invention.

The terms of degree such as "substantially", "about" and "approximately" as used herein mean a reasonable amount of deviation of the modified term such that the end result is not significantly changed. For example, these terms can be construed as including a deviation of at least ±5% of the modified term if this deviation would not negate the meaning of the word it modifies.

This application claims priority to Japanese Patent Application No. 2004-110939. The entire disclosure of Japanese Patent Application No. 2004-110939 is hereby incorporated herein by reference.

While only selected embodiments have been chosen to illustrate the present invention, it will be apparent to those skilled in the art from this disclosure that various changes and modifications can be made herein without departing from the scope of the invention as defined in the appended claims. Furthermore, the foregoing descriptions of the embodiments according to the present invention are provided for illustration only, and not for the purpose of limiting the invention as defined by the appended claims and their equivalents. Thus, the scope of the invention is not limited to the disclosed embodiments.

What is claimed is:

1. A disk apparatus adapted to record and read data on and from a recordable optical disk, and to read data from a read-only optical disk, the disk apparatus comprising:
   a spindle motor adapted to rotate an optical disk;
   a light emitter configured to emit a light beam to be reflected on the optical disk;
   a lens through which the light beam is focused on the optical disk;
   a light detector configured to detect a reflected light beam that is reflected from the optical disk, the light detector being further configured to output a detection signal based on an amount of the reflected light beam detected; and
   a controller operatively coupled to the light detector and the lens, and configured to determine whether the optical disk is a recordable optical disk based on the detection signal outputted from the light detector, the controller being further configured to adjust the lens to shift a spot on the light detector at which the reflected light beam is incident by shifting a focus point of the light beam on the optical disk in a radial direction of the optical disk at least the first time the controller determines that the optical disk is not a recordable optical disk,
   the light detector having first and second portions, which respectively output first and second detection signals, and
   the controller being configured to determine that the optical disk is a recordable disk if a differential signal indicating a difference between first and second detection signals of the first and second portions has a frequency within a frequency range of a wobble signal.

2. The disk apparatus according to claim 1, wherein the controller is configured to determine that the optical disk is a read-only optical disk when the controller determines that the optical disk is not a recordable optical disk after the spot on the light detector is shifted a predetermined number of times.

3. The disk apparatus according to claim 1, wherein the controller is configured to determine whether the optical disk is a recordable disk based on whether the detection signal outputted by the light detector has a frequency within a frequency range of a wobble signal.

4. A disk apparatus adapted to record and read data on and from a recordable optical disk, and to read data from a read-only optical disk, the disk apparatus comprising:
   rotating means for rotating an optical disk;
   light emitting means for emitting a light beam to be reflected on the optical disk;
   focusing means for focusing the light beam on the optical disk;
   light detection means for detecting a reflected light beam reflected from the optical disk, and outputting a detection signal that corresponds to an amount of light detected;
   disk determination means for determining whether the optical disk is a recordable optical disk based on whether the detection signal outputted from the light detection means has a frequency within a frequency range of a wobble signal; and
   light beam shifting means for adjusting the focusing means to shift a focus point of the light beam on the optical disk in a radial direction of the optical disk at least the first time the disk determination means determines that the optical disk is not a recordable optical disk,
   the disk determination means determining that the optical disk is a read-only optical disk when the disk determination means determines that the optical disk is not a recordable optical disk after the spot at which the light detecting means receives the reflected light beam is shifted a predetermined number of times.

5. A disk type determination method to be applied in a disk apparatus that records and reads data on and from a recordable optical disk and reads data from a read-only optical disk; comprising steps of:
   rotating an optical disk;
   emitting a light beam that is focused and reflected on the optical disk;
   detecting a reflected light beam reflected from the optical disk and outputting a detection signal based on an amount of the reflected light beam detected;

determining whether the optical disk is a recordable disk or not based on the detection signal; and shifting a focus point of the light beam on the optical disk at least after the first time it is determined that the optical disk is not a recordable optical disk, in the step of detecting the reflected light beam, first and second detection signals being outputted, and in the step of determining whether the optical disk is a recordable optical disk or not, the optical disk being determined to be a recordable disk if a differential signal indicating a difference between first and second detection signals has a frequency within a frequency range of a wobble signal.

6. The disk type determination method according to claim 5, further comprising steps of:

repeating the step of detecting a reflected light beam and the outputting of a detection signal after the shifting of a focus point of the light beam on the optical disk; and repeating the step of determining whether the optical disk is a recordable optical disk or not based on the detection signal, wherein it is determined that the optical disk is a read-only optical disk if it is determined that the optical disk is not a recordable optical disk after the focus point of the light beam on the optical disk is shifted predetermined number of times.

7. The disk type determination method according to claim 5, wherein in the step of determining whether the optical disk is a recordable optical disk or not, the determination is based on whether the detection signal has a frequency within a frequency range of a wobble signal.

\* \* \* \* \*